United States Patent
Weng et al.

(10) Patent No.: US 7,422,358 B2
(45) Date of Patent: Sep. 9, 2008

(54) BACKLIGHT MODULE

(75) Inventors: Lin-Chu Weng, Miao-Li County (TW); Ping-Feng Hwang, Miao-Li County (TW); Kun-Ming Tseng, Miao-Li County (TW)

(73) Assignee: Coretronic Corporation, Miao-Li County (TW)

(*) Notice: Subject to any disclaimer, the term of this patent is extended or adjusted under 35 U.S.C. 154(b) by 63 days.

(21) Appl. No.: 11/560,513

(22) Filed: Nov. 16, 2006

(65) Prior Publication Data

US 2007/0165420 A1 Jul. 19, 2007

(30) Foreign Application Priority Data

Jan. 13, 2006 (TW) .............................. 95101416 A

(51) Int. Cl.
*F21V 7/04* (2006.01)

(52) U.S. Cl. ...................... 362/633; 362/609; 362/613; 362/614; 362/624; 349/58

(58) Field of Classification Search ................ 362/609, 362/613, 614, 623, 624, 633; 349/58
See application file for complete search history.

(56) References Cited

U.S. PATENT DOCUMENTS 7,021,813 B2* 4/2006 Lee et al. .................... 362/609
7,207,707 B2* 4/2007 Huang et al. ................ 362/614

* cited by examiner

*Primary Examiner*—Stephen F Husar
(74) *Attorney, Agent, or Firm*—J.C. Patents

(57) ABSTRACT

A backlight module including a light source, a light guide plate, a lamp reflector and a frame is provided. The light source is disposed at a first side of the light guide plate, and surrounded by the lamp reflector and the light guide plate. The lamp reflector includes a metal substrate and a reflective material layer, and the metal substrate includes a main body and an extended part. The extended part is connected to the main body and disposed under the light guide plate. The reflective material layer is disposed on the main body, and between the main body and the light source, and the light source is surrounded by the reflective material layer and the light guide plate. The light guide and the lamp reflector are disposed on the frame. The backlight module has a better heat dissipation efficiency and lower manufacturing cost.

11 Claims, 4 Drawing Sheets

BACKLIGHT MODULE

CROSS-REFERENCE TO RELATED APPLICATION

This application claims the priority benefit of Taiwan application serial no. 95101416, filed Jan. 13, 2006. All disclosure of the Taiwan application is incorporated herein by reference.

BACKGROUND OF THE INVENTION

1. Field of the Invention

The present invention relates to a light source module, and more particularly, to a backlight module.

2. Description of Related Art

Referring to FIG. 1, a conventional backlight module 100 comprises four cathode cold fluorescent lamps (CCFL) 110, four lamp sockets 120 (only two of the lamp sockets are shown in FIG. 1), two lamp reflectors 130, a light guide plate 140 and a metal back plate 150. Each two of the CCFLs 110 are arranged in the corresponding lamp reflector 130, respectively. The lamp sockets 120 are arranged at the high voltage end and low voltage end of the CCFLs 110, and the CCFLs 110 and the lamp sockets 120 are surrounded by the lamp reflectors 130 and the light guide plate 140. Each of the lamp reflectors 130 comprises a metal substrate 132 and a reflective material layer 134. The reflective material layer 134 is disposed on the metal substrate 132 between the metal substrate 132 and the lamp sockets 120. The edge of the metal substrate 132 overlaps with the edge of the reflective material layer 134. In addition, the lamp reflectors 130 and the light guide plate 140 are disposed on the metal back plate 150.

The reflective material layer 134 is suitable for reflecting light (not shown) emitted from the CCFLs 110 toward the light guide plate 140, and the light guide plate 140 is suitable for transforming the light into a surface light source (not shown). When the CCFLs 110 emit light, waste thermal energy is also generated simultaneously, particularly at the high voltage end and the low voltage end of the CCFLs 110. The waste thermal energy is conducted to the metal substrate 132 through the lamp sockets 120 and the reflective material layer 134 for heat dissipation. Generally speaking, the area of the metal substrate 132 is smaller, such that the heat dissipation efficiency of the metal substrate 132 is limited. Accordingly, the waste thermal energy is conducted to the outside through the metal back plate 150.

However, the metal substrate 132 is not tightly contacted with the metal back plate 150 due to the manufacturing and assembly error between the metal substrate 132 and the metal back plate 150. The waste thermal energy is not likely to be conducted from the metal substrate 132 to the metal back plate 150, and it causes a poor heat dissipation efficiency of the backlight module 100. Further, a printed circuit board (not shown) is usually arranged under the metal back plate 150 for driving a liquid crystal display (LCD) panel (not shown), and therefore there is a need to arrange a plurality of insulating materials between the metal back plate 150 and the printed circuit board to prevent a short circuit therebetween. Hence, this causes the difficulty in design and a higher manufacturing cost of the backlight module 100.

SUMMARY OF THE INVENTION

Accordingly, the present invention is directed to a backlight module having a better heat dissipation efficiency and a lower manufacturing cost.

As embodied and broadly described herein, the present invention is directed to a backlight module comprising a light source, a light guide plate, a lamp reflector and a frame. The light guide plate has a first end and a second end corresponding to the first end. The light source is disposed at the first end, and the light source is surrounded by the lamp reflector and the light guide plate. The lamp reflector comprises a metal substrate and a reflective material layer, the metal substrate comprises a main body and an extended part. The extended part is disposed under the light guide plate, and comprises a corresponding fixing end and a free end. The fixing end of the extended part is connected to the main body, and the free end of the extended part extends toward a direction away from the light source. A distance exists between the free end and the second end of the light guide plate. The reflective material layer is disposed on the main body, and between the main body and the light source. The light source is surrounded by the reflective material layer and the light guide plate. Besides, the frame is disposed under the lamp reflector.

The present invention also provides a backlight module comprising a light guide plate, two light sources, two lamp reflectors and a frame. The light guide plate has a corresponding first end and a second end. The light sources are disposed at the first end and the second end, respectively. The lamp reflectors are disposed at the first end and the second end, respectively, and the light sources are surrounded by the lamp reflectors and the light guide plate. Each of the lamp reflectors comprises a metal substrate and a reflective material layer, and the metal substrate comprises a main body and an extended part. The extended part is disposed under the light guide plate and has a corresponding fixing end and a free end. The fixing end of the extended part is connected to the main body, and the free end of the extended part extends toward a direction away from the light source. A distance exists between the free end and the second end of the light guide plate. The reflective material layer is disposed on the main body and between the main body and the corresponding light source. The light source is surrounded by the reflective material layers and the light guide plate. Additionally, the frame is disposed under the lamp reflectors.

In summary, since the metal substrate comprises the extended part to assist in heat dissipation, the heat dissipation efficiency of the metal substrate is significantly enhanced. In addition, the material of the frame is not limited to metal, and therefore a manufacturing cost of the frame is reduced. Accordingly, the backlight module has a lower manufacturing cost.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
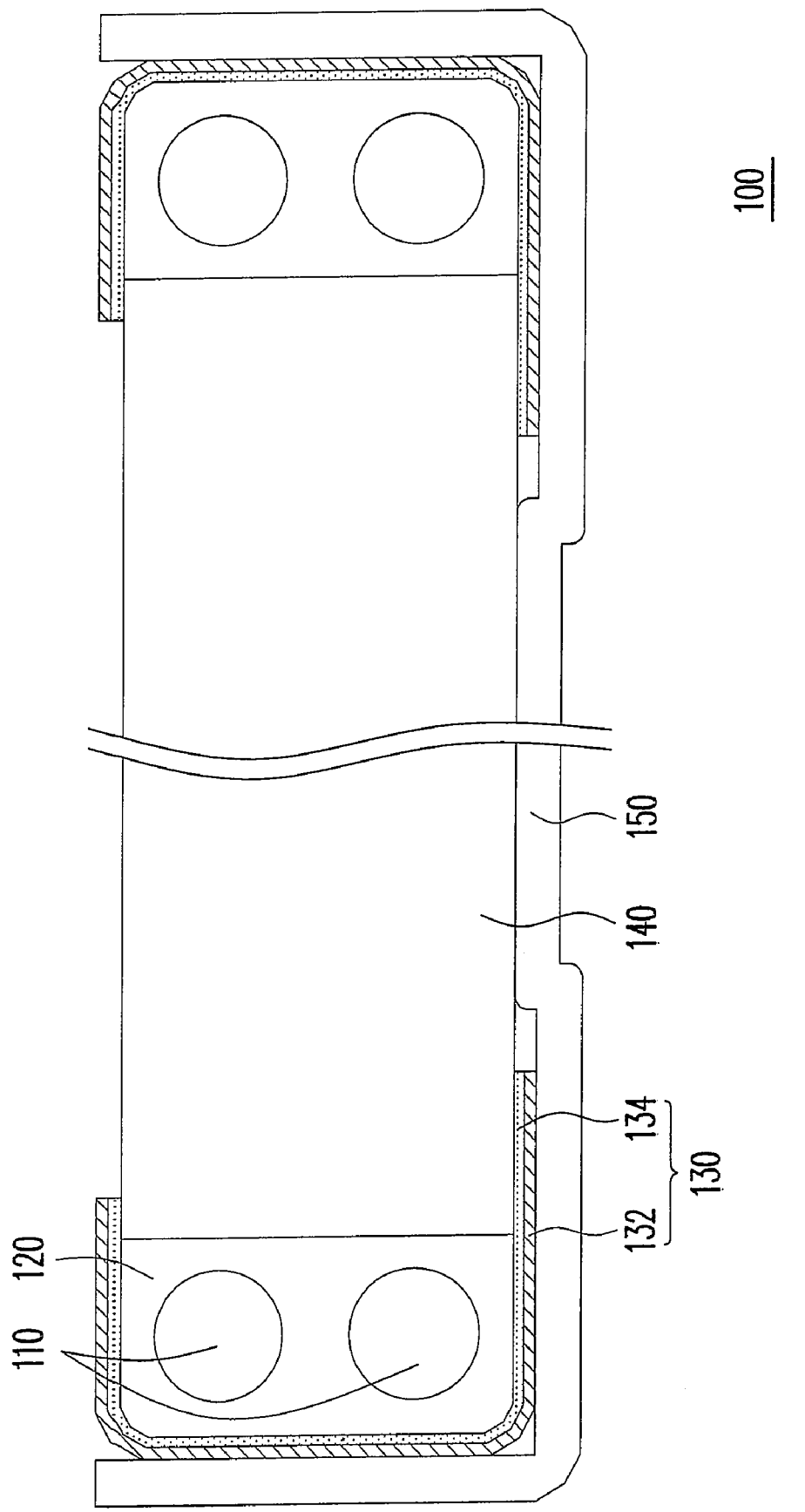
FIG. 1 is a schematic cross-sectional view showing a conventional backlight module.

Reference will now be made in detail to the present preferred embodiments of the invention, examples of which are illustrated in the accompanying drawings. Wherever possible, the same reference numbers are used in the drawings and the description to refer to the same or like parts.

Figure 2A:
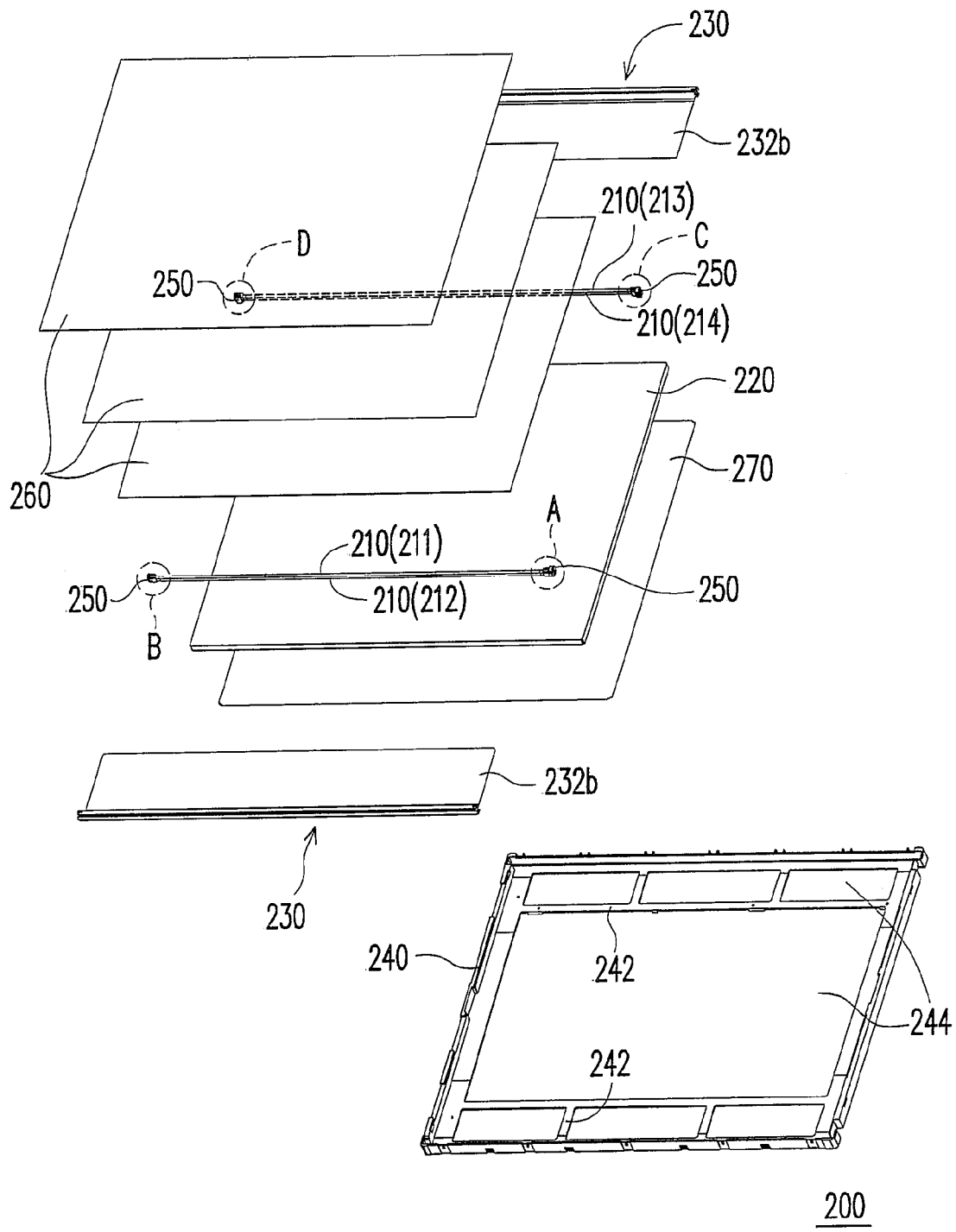
FIG. 2A is a perspective exploded view showing a conventional backlight module according to an embodiment of the present invention.
Figure 2B:
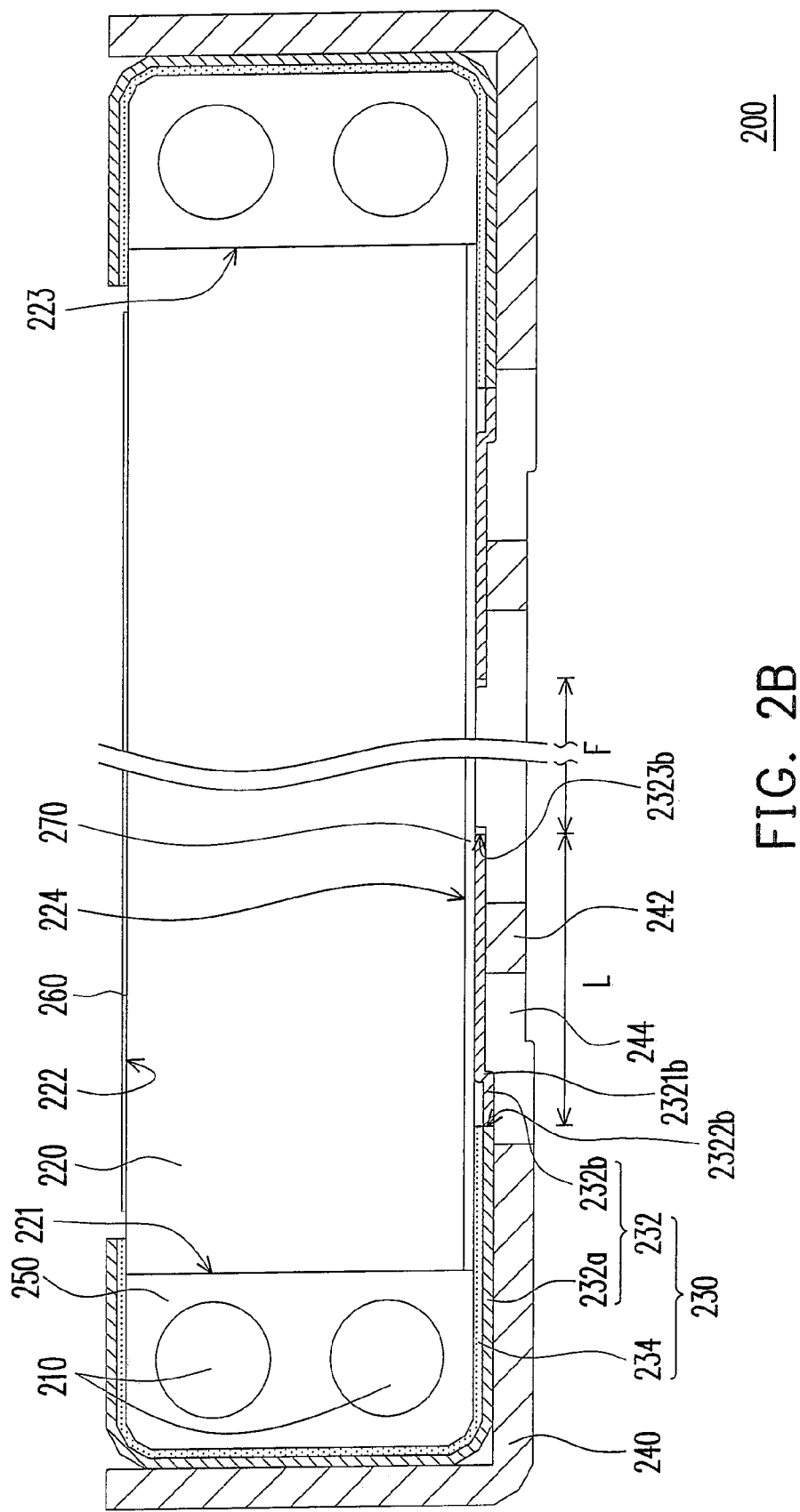
FIG. 2B is a schematic cross-sectional view showing the backlight module in FIG. 2A.

Referring to FIGS. 2A and 2B, a backlight module 200 of the present invention comprises two light sources 210, a light guide plate 220, two lamp reflectors. 230 and a frame 240. The light guide plate 220 comprises a corresponding first end 221 and a second end 223. The light sources 210 are disposed adjacent to the first end 221 and the second end 223 of the light guide plate 220, respectively. The lamp reflectors 230 are disposed adjacent to the first end 221 and the second end 223 of the light guide plate 220, respectively. The corresponding light sources 210 are surrounded by the lamp reflectors 230 and the light guide plate 220, respectively. Each of the lamp reflectors 230 comprises a metal substrate 232 and a reflective material layer 234. The metal substrate 232 comprises a main body 232a and an extended part 232b. The extended part 232b is disposed under the light guide plate 220 and comprises a corresponding fixing end 2322b and a free end 2323b. The fixing end 2322b of the extended part 232b is connected to the main body 232a, and the free end 2323b of the extended part 232b extends toward a direction away from the corresponding light source 210. The extended part 232b comprises a bending part 2321b which bends toward the light guide plate 220, such that the extended part 232b supports a reflection sheet 270 disposed under the light guide plate 220. The reflective material layer 234 is disposed on the main body 232a, and between the main body 232a and the light source 210. Each of the light sources 210 is surrounded by one of the reflective material layers 234 and the light guide plate 220, respectively. Besides, a distance F exists between the free ends 2323b of the extended parts 232b of the metal substrates 232 of the lamp reflectors 230. Further, the frame 240 is disposed under the lamp reflectors 230, and the frame 240 comprises a plurality of ribs 242 and a plurality of heat dissipation openings 244 arranged between the ribs 242, and the ribs 242 are suitable for supporting the lamp reflectors 230.

In light of the above, the reflective material layer 234 is suitable for reflecting the light (not shown) emitted from the light sources 210 toward the light guide plate 220, and the light guide plate 220 is suitable for transforming the light into a surface light source (not shown). When the light sources 210 emit light, waste thermal energy is also generated simultaneously. The waste thermal energy is conducted to the metal substrate 232 through the reflective material layer 234 for heat dissipation.

Compared with the conventional metal substrate 132 (as shown in FIG. 1), since the metal substrates 232 of the present invention have a larger area of heat dissipation, the metal substrates 232 have a better heat dissipation efficiency. Specifically, the present invention employs the extended part 232b to increase the heat dissipation area of the metal substrates 232. When the waste thermal energy is conducted to the main body 232a through the reflective material layers 234, the main body 232a dissipates the heat and conducts the waste thermal energy to the extended part 232b to enhance the heat dissipation efficiency. In this embodiment, the material of the main body 232a and the extended parts 232b are aluminum, stainless steel, galvanized steel sheet or other suitable metal material.

Additionally, the main body 232a and the extended part 232b of each of the metal substrates 232 are integrally formed, and the metal substrates 232 are formed by a punch process. However, the method of fabricating the metal substrates 232 is not limited in the present invention. For example, the extended parts 232b are connected to the main body 232a by welding to form the metal substrates 232.

The metal substrates 232 comprises the extended parts 232b for a better heat dissipation efficiency, the frame 240 is a hollow structure comprising a plurality of ribs 242 and a plurality of heat dissipation openings 244 to replace the conventional metal back plate 150 (as shown in FIG. 1). The ribs 242 are suitable for supporting the light guide plate 220 and the lamp reflectors 230, and the heat dissipation openings 244 are suitable for dissipating the waste thermal energy and also helpful to reduce the material cost. The metal substrates 232 comprise the extended parts 232b for enhancing the heat dissipation efficiency, and therefore the material of the frame 240 is not limited to metal. In this embodiment, the material of the frame 240 is plastic, for example, for reducing a manufacturing cost of the frame 240. Besides, there is no need to arrange additional insulating material for preventing a short circuit on the frame 240. Accordingly, the manufacturing cost of the backlight module 200 is reduced. The material of the frame 240 is not limited in the present invention. For example, the material of the frame 240 is metal to further improve the heat dissipation efficiency of the backlight module 200.

In this embodiment, each of the light sources 210 are composed of at least one CCFL. As shown in FIGS. 2A and 2B, each of the light sources 210 is composed of two CCFLs 211, 212 and 213, 214. The CCFLs 211, 212 and the CCFLs 213, 214 are arranged at two corresponding sides of the light guide plate 220, respectively. The backlight module 200 further comprises a plurality of lamp sockets 250 arranged at two ends of the CCFLs 211, 212, 213 and 214 and within the lamp reflectors 230 for fixing and preventing collision of the light sources 210. Two ends of each of the CCFLs 211, 212, 213 and 214 are a high voltage end and a low voltage end, respectively, and these are the input of the power. Since the waste thermal energy is easily generated near the high voltage ends and the low voltage ends, the lamp sockets 250 arranged at two ends of the CCFLs 211, 212, 213 and 214 conduct the waste thermal energy to the lamp reflectors 230 to dissipate heat through the metal substrates 232 of the lamp reflectors 230. The types and numbers of the light sources are not limited in the present invention. For example, the light sources 210 are a plurality of light emitting diodes (LEDs).

The metal substrates 232 employ the extended parts 232b to increase the heat dissipation area and cooperate with the frame 240 having the heat dissipation openings 244, such that the waste thermal energy generated from the light sources 210 is conducted through the electrodes of the light sources 210, the lamp sockets 250, the reflective material layers 234 and the metal substrates 232 of the lamp reflectors 230 to the heat dissipation openings 244 of the frame 240. In the conventional backlight module, after the waste thermal energy is conducted to the metal substrates 132 of the lamp reflectors 130, the waste thermal energy is conducted to the metal back plate 150. The present invention is shortened the conduction path of the waste thermal energy to reduce the loss of heat conduction. Further, the present invention does not utilize the metal back plate for heat dissipation, and thus the problem of poor heat dissipation efficiency due to loose contact between the metal back plate and the metal substrate is avoided.

The simulation of heat dissipation efficiency of the backlight module 200 of the present invention and the conventional backlight module 100 (as shown in FIG. 1) is shown in the following. The simulation parameters of the backlight modules are directed to 17-Inch liquid crystal display panels, and the length and width of each of the backlight modules are 400 mm and 300 mm, respectively. The simulation is to change the length L of the extended parts 232b to compute the working temperature of the CCFLs 211, 212, 213 and 214. The simulation data is shown in Table 1.

It is clear from Table 1 that the working temperature of the CCFLs 211, 212, 213 and 214 decreases with the increased length L of the extended parts 232b. Besides, the length L of the extended parts 232b is 60 mm to achieve a better heat dissipation efficiency and consider the safety factor of the product. The measured actual working temperature of the backlight module comprising the extended parts 232b having a length of 60 mm as a parameter is shown in Table 2.

The A, B, C and D shown in Table 2 represent the measured working temperature of a measured region A, B, C and D (as shown in FIG. 2A), and the measured regions of the conventional backlight module 100 (as shown in FIG. 1) are the same as those of the backlight module 200 of the present invention. In addition, other related parameters of this experiment are shown in the following: the length L and thickness of the extended part 232b are 60 mm and 0.3 mm, respectively, and the material of the extended part 232b is aluminum. Further, the material of the frame 240 is plastic, and the conventional backlight module adopts the metal back plate 150 (as shown in FIG. 1) having a better heat dissipation efficiency.

It is clear from Table 2 that the average temperature of the backlight module of the present invention is lower than the average temperature of the conventional backlight module. Accordingly, the backlight module 200 of the present invention has a better heat dissipation efficiency. For the CCFL, when the temperature difference between the ends of the lamp tube is too large, the mercury inside the lamp tube flows from the high voltage end to the low voltage end, and this causes the uneven distribution of the mercury and uneven chromaticity. Due to the temperature difference between the measured region A (the low voltage end) and the measured region B (the high voltage end) and the temperature difference between the measured region C (the low voltage end) and the measured region D (the high voltage end), the temperature difference of the backlight module of the present invention is lower than that of the conventional backlight module by 3° C. to 4° C. Accordingly, the heat dissipation design of the present invention also improves the problem of uneven chromaticity. Additionally, compared with the conventional expensive metal back plate, the frame 240 is a low-cost plastic frame and therefore the manufacturing cost of the backlight module 200 of the present invention is reduced. Moreover, although the length L of the extended part 232b of this embodiment is 60 mm, the length or area of the extended part 232b is not limited in the present invention.

Additionally, the backlight module 200 of this embodiment further comprises a plurality of optical films 260 and a reflection sheet 270 to improve the optical quality of the backlight module 200. The optical films 260 are disposed on a light emitting surface 222 of the light guide plate 220, and the reflection sheet 270 is arranged on a surface 224 of the light guide plate 220 corresponding to the light emitting surface 222. The extended part 232b of the metal substrate 232 is suitable for supporting the reflection sheet 270. Besides, the optical films 260 are selected from a group consisting of diffusers, brightness enhanced films, polarizers and combinations thereof. The surface light source provided by the backlight module 200 comprising these optical films has a better uniformity and a higher brightness.

In addition, the backlight module 200 of this embodiment is a double-side light emitting backlight module and therefore the light guide plate 220 having a plate form is required. However, the type of the backlight module is not limited in the present invention. Another embodiment of the present invention is illustrated in the accompanying drawings as follows.

Figure 3:
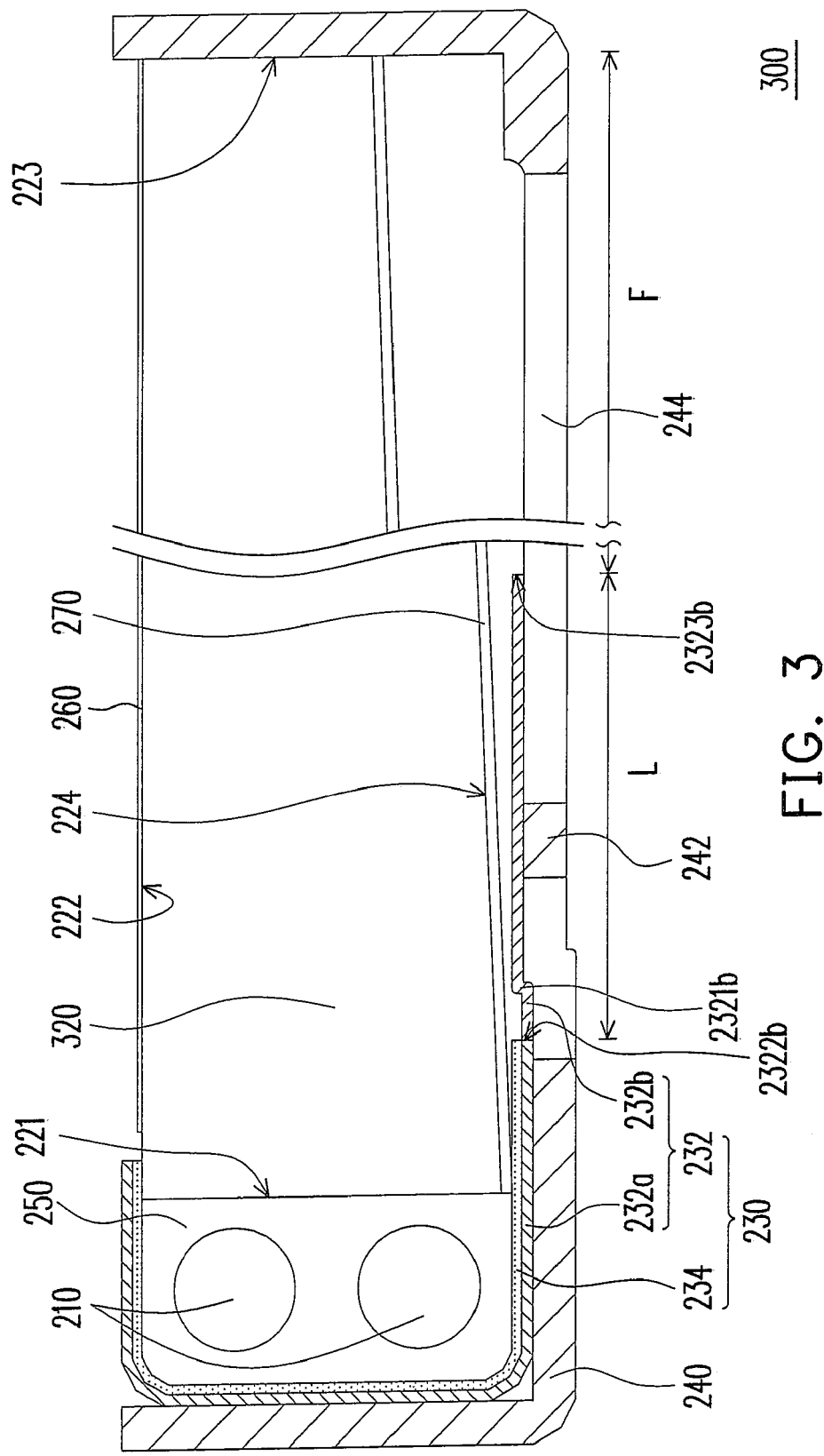
FIG. 3 is a schematic cross-sectional view showing a backlight module according to another embodiment of the present invention.

Referring to FIG. 3, since the backlight module 300 in this embodiment is similar to the backlight module 200 (as shown in FIG. 2B), the same reference numbers are used in the drawings to refer to the like parts for convenience. The backlight module 300 of this embodiment comprises a light source 210, a light guide plate 320, a lamp reflector 230 and a frame 240. The light guide plate 320 has a corresponding first end 221 and a second end 223. The light source 210 is disposed adjacent to the first end 221, and the light source 210 is surrounded by the lamp reflector 230 and the light guide plate 320. The lamp reflector 230 comprises a metal substrate 232 and a reflective material layer 234, and the metal substrate 232 comprises a main body 232a and an extended part 232b. The extended part 232b is disposed under the light guide plate 320 and has a corresponding fixing end 2322b and a free end 2323b. The fixing end 2322b of the extended part 232b is connected to the main body 232a, and the free end 2323b of the extended part 232b extends toward a direction away from the light source 210. A distance F exists between the free end 2323b and the second end 223. The extended part 232b comprises a bending part 2321b which bends toward the light guide plate 220, and the bending part 2321b is near the section where the extended part 232b is connected to the main body 232a, such that the extended part 232b supports the reflection sheet 270 under the light guide plate 320. The reflective material layer 234 is disposed on the main body 232a and between the main body 232a and the light source 210, and the light source 210 is surrounded by the reflective material layer 234 and the light guide plate 320.

Additionally, the frame 240 is disposed under the lamp reflectors 230, and the frame 240 comprises a plurality of ribs 242 and a plurality of heat dissipation openings 244 arranged between the ribs 242, wherein the ribs 242 are suitable for supporting the lamp reflector 230. Moreover, the backlight module 300 of this embodiment is a single-side light emitting backlight module, and therefore a wedge-shaped light guide plate is required. Since the metal substrate 232 comprises the extended part 232b to assist in heat dissipation, the backlight module 300 of this embodiment has a better heat dissipation efficiency.

In summary, the backlight module of the present invention has at least the following advantages:

1. Compared with the conventional backlight module, the metal substrate of the present invention has a larger heat dissipation area, and accordingly the heat dissipation efficiency of the backlight module of the present invention is better.

2. The present invention employs a hollow frame structure to replace the conventional metal back plate and the material of the frame is plastic. Therefore, the manufacturing cost of the backlight module is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

TABLE 1

|  | Length of the extended part | Temperature of the CCFL 211 | Temperature of the CCFL 212 | Temperature of the CCFL 213 | Temperature of the CCFL 214 |
| --- | --- | --- | --- | --- | --- |
| The conventional backlight module | 0 | 139.94° C. | 136.74° C. | 141.38° C. | 137.52° C. |
| The backlight module of the present invention | 30 mm | 136.67° C. | 135.13° C. | 141.32° C. | 139.17° C. |
|  | 40 mm | 134.61° C. | 133.03° C. | 138.29° C. | 136.08° C. |
|  | 50 mm | 133.30° C. | 131.68° C. | 136.35° C. | 134.10° C. |

TABLE 2

|  | A | B | C | D | Average temperature |
| --- | --- | --- | --- | --- | --- |
| The conventional backlight module | 73.4° C. | 80.3° C. | 71.7° C. | 81.5° C. | 76.7° C. |
| The backlight module of the present invention | 69.4° C. | 73.8° C. | 69.0° C. | 77.2° C. | 72.3° C. |

What is claimed is:

1. A backlight module, comprising:
a light guide plate, having a first end and a second end corresponding to the first end;
a light source, disposed adjacent to the first end;
a lamp reflector, the light source surrounded by the lamp reflector and the light guide plate, the lamp reflector comprising:
a metal substrate, comprising a main body and an extended part, wherein the extended part is disposed under the light guide plate, a fixing end of the extended part is connected to the main body, a free end corresponding to the fixing end extends toward a direction away from the light source, and a distance exists between the free end and the second end of the light guide plate, wherein the extended part extended along a direction of the free end comprises a bending part which bends toward the light guide plate, and the bending part is near the fixing end;
a reflective material layer, disposed on the main body and between the main body and the light source, wherein the light source is surrounded by the reflective material layer and the light guide plate; and
a frame, disposed under the lamp reflector, wherein the frame comprises a plurality of ribs and a plurality of heat dissipation openings arranged between the ribs, and the ribs are suitable for supporting the lamp reflector.

2. The backlight module according to claim 1, wherein the main body and the extended part are integrally formed.

3. The backlight module according to claim 1, wherein a material of the metal substrate comprises aluminum, stainless steel or galvanized steel sheet.

4. The backlight module according to claim 1, wherein a material of the frame comprises plastic.

5. The backlight module according to claim 1, further comprising a reflection sheet, the light guide plate having a light emitting surface, the reflection sheet being arranged on a surface of the light guide plate corresponding to the light emitting surface, and the extended part of the metal substrate being suitable for supporting the reflection sheet.

6. A backlight module, comprising:
a light guide plate, having a first end and a second end corresponding to the first end;
two light sources, disposed adjacent to the first end and the second end, respectively;
two lamp reflectors, disposed adjacent to the first end and the second end, respectively, the light sources surrounded by the lamp reflectors and the light guide plate, each of the lamp reflectors comprising:
a metal substrate, comprising a main body and an extended part, wherein the extended part is disposed under the light guide plate, a fixing end of the extended part is connected to the main body, a free end is corresponding to the fixing end, and a distance exists between each of the free ends, wherein the extended part extended along a direction of the free end comprises a bending part which bends toward the light guide plate, and the bending part is near the fixing end;
a reflective material layer, disposed on the main body and between the main body and the corresponding light source, wherein the light source is surrounded by the reflective material layers and the light guide plate; and
a frame, disposed under the lamp reflectors, wherein the frame comprises a plurality of ribs and a plurality of heat dissipation openings arranged between the ribs, and the ribs being suitable for supporting the lamp reflector.

7. The backlight module according to claim 6, further comprising a reflection sheet, the light guide plate having a light emitting surface, the reflection sheet being arranged on a surface of the light guide plate corresponding to the light emitting surface, and the extended part of the metal substrate being suitable for supporting the reflection sheet.

8. The backlight module according to claim 6, wherein a material of the main body and the extended parts comprises metal.

9. The backlight module according to claim 6, wherein a material of the frame comprises plastic.

10. The backlight module according to claim 6, wherein the main body and the extended part of each of the metal substrate are integrally formed.

11. The backlight module according to claim 6, wherein the light sources are cathode cold fluorescent lamps.

* * * * *